(12) United States Patent
Niemelä

(10) Patent No.: US 6,335,607 B1
(45) Date of Patent: Jan. 1, 2002

(54) METHOD OF CORRECTING FLUX MIDPOINT IN FLUX-CONTROLLED ALTERNATING CURRENT SYSTEMS

(75) Inventor: Markku Niemelä, Lappeenranta (FI)

(73) Assignee: ABB Industry Oy, Helsinki (FI)

( * ) Notice: Subject to any disclaimer, the term of this patent is extended or adjusted under 35 U.S.C. 154(b) by 0 days.

(21) Appl. No.: 09/647,095
(22) PCT Filed: Mar. 24, 1999
(86) PCT No.: PCT/FI99/00239
  § 371 Date: Sep. 26, 2000
  § 102(e) Date: Sep. 26, 2000
(87) PCT Pub. No.: WO99/49564
  PCT Pub. Date: Sep. 30, 1999

(30) Foreign Application Priority Data

Mar. 26, 1998 (FI) .................................................. 980685

(51) Int. Cl.$^7$ .............................................. H02P 21/00
(52) U.S. Cl. ...................................... 318/804; 318/798
(58) Field of Search ................................. 318/767, 798, 318/799, 800, 801, 804

(56) References Cited

U.S. PATENT DOCUMENTS

| | | | | |
|---|---|---|---|---|
| 4,885,518 A | * | 12/1989 | Schauder ..................... | 318/798 |
| 5,694,015 A | * | 12/1997 | Luniewicz et al. .......... | 318/611 |
| 5,936,377 A | * | 8/1999  | Blaschke et al. ............ | 318/807 |
| 6,094,364 A | * | 7/2000  | Heikkila ...................... | 363/41 |
| 6,242,885 B1| * | 6/2001  | Ide et al. ..................... | 318/811 |

FOREIGN PATENT DOCUMENTS

| | | |
|---|---|---|
| FI | C 94201 | 8/1992 |
| FI | C 90163 | 9/1993 |
| FI | C 87281 | 4/1995 |

OTHER PUBLICATIONS

Annual IEEE Power Electronics Specia Conference, vol. 2, 1998, New York USA, Myoung Ho Shin et al., "An Improved Stator Flux Estimation For Speed Sensorless Stator Flux, ISBN 0780344898", pp. 1581 1586, *abstract.
Proceedings of The Annual Appled Power Electronics . . . , vol. 1, Mar. 1995, Dalas, Chapuis Y. A. et al., "Principles and Implementation of Direct Torque Control By Stator Flux, ISBN 0–7803–2483–8", *abstract.
IAS '96 Conference Record of the 1996 IEE Industry Applic . . . , vol. 1, Oct. 1996, San Diego, CA, Veltman A., "Symmetrical Stator Flux Orbits For Direct Flux and Torque Controlled, ISBNO–7803–3454–7", *abstract.

* cited by examiner

*Primary Examiner*—Bentsu Ro
(74) *Attorney, Agent, or Firm*—Dykema Gossett PLLC

(57) ABSTRACT

The invention relates to a method of correcting the flux midpoint in flux-controlled alternating current systems, the method comprising the steps of determining a stator flux estimate ($\psi_{s,est}$) and determining the magnitude of stator current ($i_s$). The method is characterized by the steps of forming the scalar product between the stator flux estimate ($\psi_{s,est}$) and the stator current ($i_s$) in order to obtain a reference variable (k), low-pass filtering the reference variable (k) in order to obtain a low-frequency component ($k_{filt}$) of the reference variable (k), subtracting the low-frequency component ($k_{filt}$) from the reference variable (k) in order to obtain a difference variable (e), determining correction term components ($\psi_{s,x,corr}$, $\psi_{s,y,corr}$) of the staror flux estimate ($\psi_{s,est}$) by multiplying the difference variable (e) by the components ($\psi_{s,x,est}$, $\psi_{s,y,est}$) of the stator flux and correction coeficient ($K_{\psi corr}$), and forming a stator flux ($\psi_{s,fin}$) with a corrected midpooint on the basis of the components ($\psi_{s,x,est}$, $\psi_{s,y,est}$) of the stator flux estimate and correction term components ($\psi_{s,x,corr}$, $\psi_{s,y,corr}$).

5 Claims, 1 Drawing Sheet

METHOD OF CORRECTING FLUX MIDPOINT IN FLUX-CONTROLLED ALTERNATING CURRENT SYSTEMS

BACKGROUND OF THE INVENTION

This invention relates to a method of correcting the flux midpoint in flux-controlled alternating current systems, the method comprising the steps of determining a stator flux estimate and determining the magnitude of stator current.

In control of alternating current machines it is known to use a stator flux estimate representing the electric state of the machine. A flux-controlled system of this kind is for example an inverter which is based on direct control of the torque and in which the control of the drive is based on continuous estimation of the stator flux. The stator flux estimate is usually determined by integrating the stator voltage vector from which the resistive losses caused by the stator current have been subtracted according to equation (1)

$$\Psi_{s,est} = \int (u_s - r_{s,est} i_s) dt \quad (1)$$

Equation (1) is illustrated in a stator coordinate system in which the stator voltage vector $u_s$ and stator current vector $i_s$ are combined vector variables representing the voltages and currents of all the system phases, and thus the stator flux estimate $\Psi_{s,est}$ is also a vector variable. In practice the parameters of equation (1) contain errors. Integration cannot be performed completely without errors, either, and consequently the stator flux estimate will also be erroneous. Since the voltages and currents of alternating current systems alternate sinusoidally, the vertex of the vectors calculated on the basis of the corresponding variables draws an origin-centred circle. Thus the flux determined on the basis of voltages and currents is described by an origin-centred circle.

The calculated stator flux does not, however, remain origin-centred due to the above-mentioned error factors. In practice, the flux controlling systems correct the calculated flux so that it is origin-centred, and thus the real flux of the motor will be erroneous. Consequently, the stator flux estimate $\Psi_{s,est}$ has to be corrected by different methods before it can be utilized for the actual control.

The variable corresponding to the flux can also be determined for other alternating current systems, e.g. for an electric network, in which case the power to be fed into the electric network can be controlled by the same principles as the alternating current machine. In control of the power to be fed into the network it is also important to obtain a realistic estimate for the flux value corresponding to the network voltage.

In flux-controlled motors eccentricity of the flux is usually corrected by means of a current model drawn up for the machine, in which the stator current vector determined on the basis of the alternating currents of the machine serves as the feedback variable. In synchronous machines the measured magnetization current can also be used as the feedback variable. The current model includes all inductance and resistance parameters of the machine and any reduction coefficients, whose accuracy determines the accuracy of the flux estimate obtained from the current model. In practice the current model is always erroneous because of inaccurate machine parameters.

The current vector and motor model are used for calculating the stator flux of the machine, which is not, however, necessarily used as the basis of machine control in flux-controlled apparatuses because if the inductance parameters of the motor model are erroneous, they will cause errors in angle and magnitude in the stator flux estimate. The calculated estimate can, however, be used for keeping the stator flux vector origin-centred, although it will contain other errors. Thus the static torque error cannot be eliminated by using the current model. In flux control the machine is controlled directly by means of the stator voltage integral and measured current vector, and thus the current model drawn up for the machine is unnecessary. However, the current model is used for improving the accuracy of the motor control.

Eccentricity of the stator flux can be noticed indirectly by observing the phase currents of the stator. The eccentricity of the flux causes direct current components in the stator phase currents. These DC components distort the waveforms of the phase currents, and thus it can be concluded from the waveforms that the stator flux has become eccentric. The fact that the stator flux has become distorted can be concluded for example by observing the zero crossing times or amplitude differences of the phase currents.

BRIEF DESCRIPTION OF THE INVENTION

The object of this invention is to provide a method which eliminates the above-mentioned drawbacks and allows to correct the flux midpoint in flux-controlled alternating current systems in a more reliable manner and by a simpler method. This object is achieved with the method of the invention which is characterized in that the method also comprises the steps of forming the scalar product between the stator flux estimate and the stator current in order to obtain a reference variable, low-pass filtering the reference variable in order to obtain a low-frequency component of the reference variable, subtracting the low-frequency component from the reference variable in order to obtain a difference variable, determining correction term components of the stator flux estimate by multiplying the difference variable by the components of the stator flux and correction coefficient, and forming a stator flux with a corrected midpoint on the basis of the components of the stator flux estimate and correction term components.

The method of the invention is based on the idea that any eccentricity in the stator flux is corrected by means of the scalar product between the stator flux estimate and the stator current and by means of the components of the stator flux estimate.

An advantage of the method of the invention is the high reliability and great accuracy with which the stator flux describes the real stator flux. Furthermore, the method is simple and can be widely applied to correcting the midpoint of alternating current systems, such as rotating field machines and electric networks.

When the method is used in connection with rotating field machines, such as an induction motor, excluding a standing machine and the lowest frequencies, only the stator resistance of the motor parameters needs to be known or measured, whereas in prior art methods of correcting the midpoint inductance parameters of the machine have to be estimated in addition to the resistance. The method of the invention is suitable for use in all rotating field machines regardless of their degree of saturation.

The flux correction method according to the invention allows to make the best use of the direct flux control method. When the correction method of the invention is used, a rotating field machine can, for the first time, be controlled in a wide range of rotation speeds almost without any information on motor parameters. Thanks to the method flux-controlled apparatuses also achieve an excellent dynamic capacity even without any feedback information on the rotation speed of the feedback motor.

BRIEF DESCRIPTION OF THE DRAWINGS

The invention will now be described in greater detail by means of preferred embodiments with reference to the accompanying drawing, in which.

DETAILED DESCRIPTION OF THE INVENTION

Figure 1:
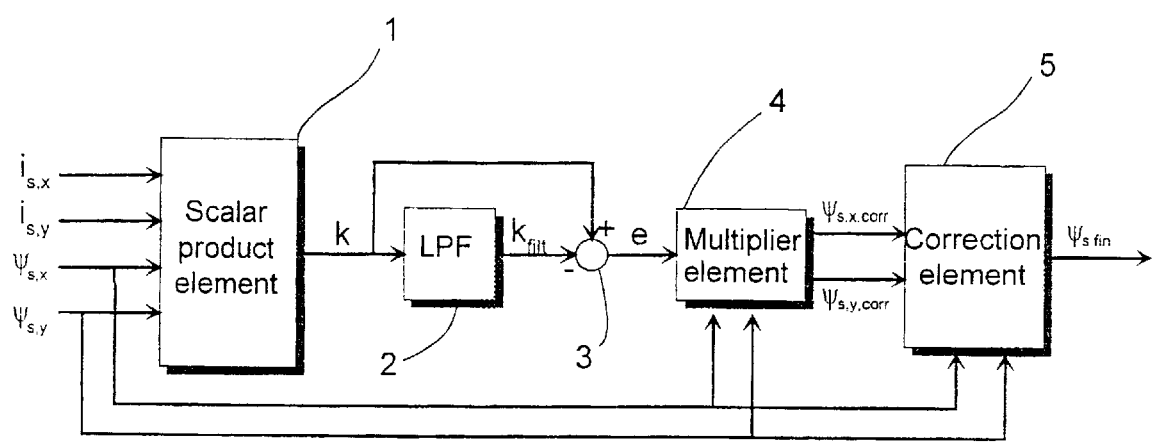
FIG. 1 is a block diagram illustrating the method of the invention.

According to FIG. 1, signals representing the stator current $i_{s,x}$, $i_{s,y}$ and the stator flux estimate $\Psi_{s,x,est}$, $\Psi_{s,y,est}$ are supplied to a scalar product element 1. In FIG. 1 these variables are illustrated as divided into =components parallel with the x and y axes. By combining the x and y components of the variables we obtain a vector variable which represents a momentary state of all phases in an alternating current system. The stator current is usually determined by measuring, which yields an accurate estimate of it, and thus the rotating field machine can be controlled. The stator flux estimate can be determined for example according to equation (1). In that case one needs to know the stator resistance r of the machine parameters. The flux can also be determined by means of the current model of the machine, in which case information is also needed on the other machine parameters. If the machine is, however, designed for a use in which its frequency is near to the zero frequency, it is necessary to use the current model and the machine parameters related to it.

The scalar product element 1 of FIG. 1 forms the scalar product between the stator vector $i_s$ and the stator flux estimate $\Psi_{s,est}$. The scalar product is obtained by multiplying the same directional components of the variables together and by adding the products derived together. Thus the scalar product element calculates the equation $\Psi_{s,est} \cdot i_s = \Psi_{s,x,est} i_{s,x} + \Psi_{s,y,est} i_{s,y}$ which yields a scalar reference variable k. Even though the rotating field machine is used as an example in the specification, the controlling method can also be applied to other alternating current systems, e.g. to the control of an electric network.

The output of the scalar product element 1 is connected to a low-pass filter 2 where the reference variable k is low-pass filtered, and to the positive input of an adder 3. The output of the low-pass filter 2 containing a low-frequency component $k_{filt}$ of the reference variable is connected to the negative input of the adder 3. A value higher than the value of the electric period is used as the filtering time constant of the low-pass filter 2, and thus low-pass filtering effectively removes higher frequencies from the reference variable.

One input of the adder 3 contains the reference variable k from which the low-pass filtered portion $k_{filt}$ of the reference variable connected to the other input is subtracted. Thus the output of the adder is a difference variable e which represents the difference between the reference variable k and its low-pass filtered portion $k_{filt}$, the difference thus comprising high-frequency components of the scalar product formed in the scalar product element 1.

According to the invention, the difference variable e is supplied to the input of a multiplier element 4. As is illustrated in FIG. 1, the x and y components $\Psi_{s,x,est}$, $\Psi_{s,y,est}$ of the estimated stator flux are supplied to the two other inputs of the multiplier element to obtain correction term components $\Psi_{s,x,corr}$, $\Psi_{s,y,corr}$ of the stator flux. The multiplier element multiplies the difference variable e separately by both components of the stator flux estimate. The multiplier element 4 further comprises a correction factor $K_{\Psi corr}$ which is also used as the coefficient in both the products to be calculated. According to an embodiment of the invention, the correction coefficient is a constant coefficient which scales the correction term components obtained as the output of the multiplier element 4 so as to render them suitable for further use.

According to another embodiment, the correction coefficient $K_{\Psi corr}$ included in the multiplier element 4 is a correction term which is proportional to the frequency and dependent on the machine parameters. Thus the correction coefficient can be used for influencing e.g. the phase shift of the correction term components obtained as the output from the multiplier element 4.

According to the invention, the correction term components $\Psi_{s,x,corr}$, $\Psi_{s,y,corr}$ obtained from the multiplier element 4 are used for determining the components $\Psi_{s,x,fin}$, $\Psi_{s,y,fin}$ of the stator flux estimate with a corrected midpoint. The stator flux values $\Psi_{s,x,fin}$, $\Psi_{s,y,fin}$ obtained as the result of the final correction performed by the correction element 5 are used as the best possible estimates of the magnitude of the stator flux of the rotating field machine. Outputs of the multiplier element 4 and the original stator flux estimates $\Psi_{s,x,est}$, $\Psi_{s,y,est}$ are connected to the inputs of the correction element 5. According to an embodiment of the invention, the components of the stator flux estimate with a corrected midpoint are derived by adding the correction term components to the corresponding flux estimate components. In terms of vectors, the vectors $\Psi_{s,est}$, $\Psi_{s,corr}$ consisting of x and y components are added together in order to obtain a stator flux vector $\Psi_{s,fin}$ with a corrected midpoint.

According to an embodiment of the method of the invention, the correction element 5 is used for adding constants that are proportional to the signs of the correction term components $\Psi_{s,x,corr}$, $\Psi_{s,y,corr}$ obtained from the multiplier element 4 to the original flux estimate components $\Psi_{s,x,est}$, $\Psi_{s,y,est}$ in order to obtain a stator flux estimate with a corrected midpoint. In that case the signs of the correction term components are checked in the correction element 5 and predetermined constant correction terms are added to the flux estimate components depending on their signs.

For the sake of clarity and simplicity the method of the invention has been described above using the rotating field machine as an example. However, the method of the invention is not restricted to the case described above, but may be utilized in other alternating current systems, such as electric networks.

It will be obvious to a person skilled in the art that the inventive concept may be implemented in several different ways. Thus the invention and its embodiments are not restricted to the examples described above, but they may vary within the scope of the claims.

What is claimed is:

1. A method of correcting the flux midpoint in flux-controlled alternating current systems, the method comprising the steps of determining a stator flux estimate ($\psi_{s,est}$) and determining the magnitude of stator current ($i_s$), wherein the method also comprises the steps of forming the scalar product between the stator flux estimate ($\psi_{s,est}$) and the stator current ($i_s$) in order to obtain a reference variable (k), low-pass filtering the reference variable (k) in order to obtain a low-frequency component ($k_{filt}$) of the reference variable (k), subtracting the low-frequency component ($k_{filt}$) from the reference variable (k) in order to obtain a difference variable (e), determining correction term components ($\psi_{s,x,corr}$, $\psi_{s,y,corr}$) of the stator flux estimate ($\psi_{s,est}$) by multiplying the difference variable (e) by the components ($\psi_{s,x,est}$, $\psi_{s,y,est}$) of the stator flux and correction coefficient ($K_{\psi corr}$), and forming a stator flux ($\psi_{s,fin}$) with a corrected midpoint on the basis of the components ($\psi_{s,x,est}$, $\psi_{s,y,est}$) of the stator flux estimate and correction term components ($\psi_{s,x,corr}$, $\psi_{s,y,corr}$).

2. A method according to claim 1, wherein forming of the stator flux ($\psi_{s,fin}$) with a corrected midpoint comprises a step in which correction term components ($\psi_{s,x,corr}$, $\psi_{s,y,corr}$) are added to the components ($\psi_{s,x,est}$, $\psi_{s,y,est}$).

3. A method according to claim 1, wherein forming of the stator flux ($\psi_{s,fin}$) with a corrected midpoint comprises a step in which constant correction terms based on the signs of the correction term components ($\psi_{s,x,corr}$, $\psi_{s,y,corr}$) are added to the components ($\psi_{s,x,est}$, $\psi_{s,y,est}$) of the stator flux estimate.

4. A method according to claim 1, wherein the correction coefficient ($K_{\psi corr}$) is constant.

5. A method according to claim 1, wherein the correction coefficient ($K_{\psi corr}$) is proportional to the frequency of the alternating current system.

* * * * *